March 20, 1951  H. HALL  2,545,882
APPARATUS FOR SCRAPING AND CLEANING CONVEYER BELTS
Filed Oct. 17, 1947  2 Sheets-Sheet 1
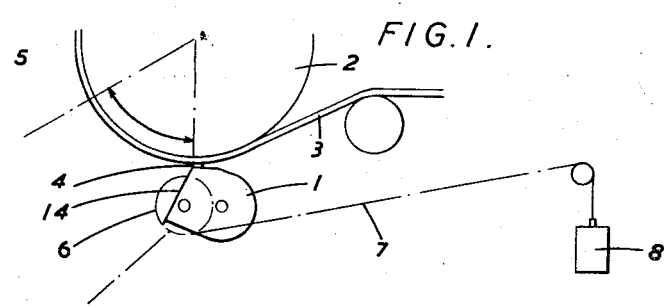
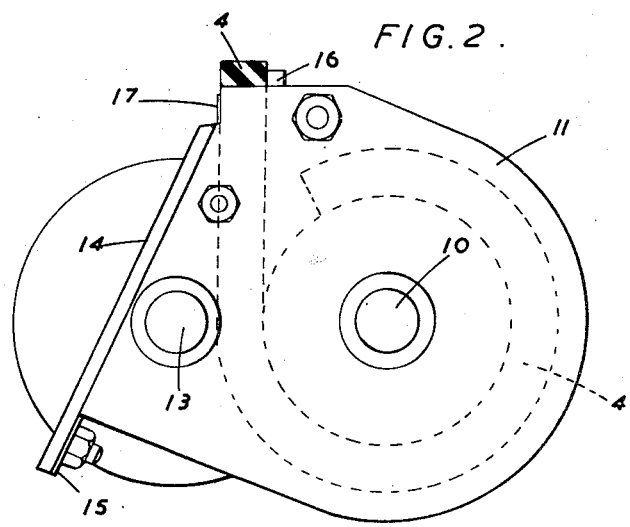
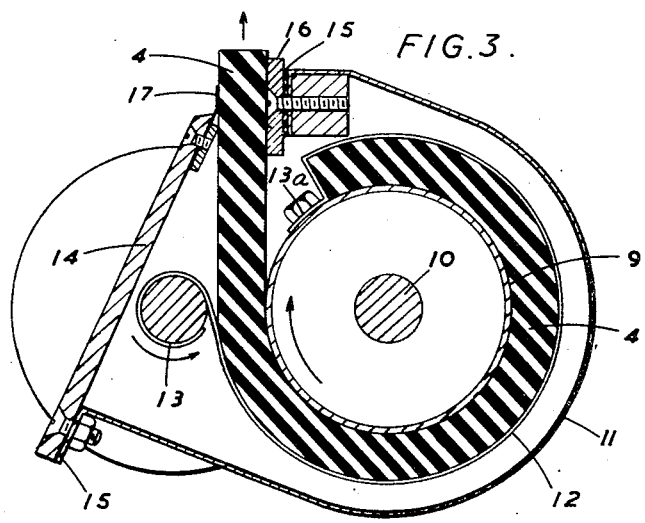
INVENTOR
HARRY HALL

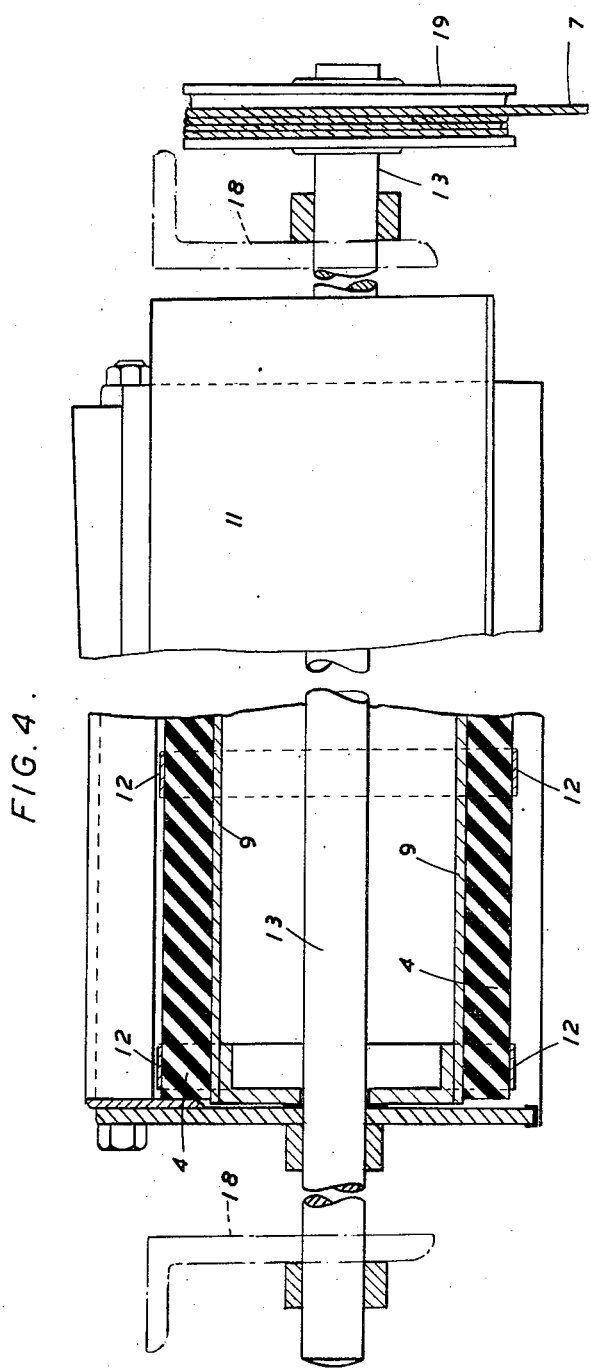

Patented Mar. 20, 1951

2,545,882

UNITED STATES PATENT OFFICE 2,545,882

APPARATUS FOR SCRAPING AND CLEANING CONVEYER BELTS

Harry Hall, Erith, England

Application October 17, 1947, Serial No. 780,554
In Great Britain October 25, 1946

3 Claims. (Cl. 198—230)

This invention relates to apparatus for scraping and cleaning conveyor belts. It is usual when conveying materials such as coal, ores, ballast and the like for a quantity of the material to remain on the conveyor belt after the bulk has been discharged at the discharge point; as a result the remaining material drops from the belt at all points along its return path. This is generally undesirable as it is preferred that the remaining material should be removed at one point.

The principal object of the present invention is to provide a simple and compact form of apparatus which will remove the remaining material from the conveyor belt. A further object of the invention is to provide means for maintaining the scraper in continuous contact with the belt so that despite wear on the scraper it will remain in its operative position over comparatively long periods without requiring replacement at frequent intervals.

According to one feature of the invention the apparatus includes a roller, spaced from said conveyor belt, a scraper strip mounted about said roller with an end of said strip projecting from said roller, a shaft spaced from said roller, connecting means between said roller and said shaft for transmitting rotation to said roller from said shaft, and means urging said shaft rotatively to maintain the projecting end of said scraper strip in contact with said conveyor belt.

Preferably the scraper strip is maintained about the roller by means of the connecting elements.

In a further feature of the invention a portion of the connecting means intermediate its ends passes about said roller to maintain the scraper strip thereon, the ends of the connecting means being connected respectively to the roller and to the shaft to transmit rotary movement from said shaft to said roller.

The connecting elements may be of any desired form but preferably they comprise non-corrosive strips of metal.

In order to prevent clogging and deterioration of the scraping mechanism the scraper strip, roller, connecting elements and shaft are supported in a liquid-tight housing, which is provided with an aperture through which the operative end of the scraper projects into contact with the conveyor belt.

The shaft, according to the present invention, is rotated by means of a pulley fixed thereto around which one or more turns of a cable are taken, one end of the cable being secured to the pulley and the other end to a weight or spring so that the cable is under tension and tends to rotate the pulley to rotate the shaft thereby maintaining the scraper strip in contact with the belt.

Preferably one side of the housing is constructed to form a chute down which the material removed from the conveyor belt by the scraper is directed.

The present invention also includes a conveyor comprising a conveyor belt supported on rollers in combination with the scraping apparatus hereinbefore referred to. It is preferred to arrange the scraping apparatus so that it engages the conveyor belt at a point in the neighbourhood of a roller on which the belt is supported, whereby the belt tends to be compressed between the scraper and the roller.

In order that the invention may be more easily understood and readily put into practice a convenient embodiment thereof will hereinafter be described by way of example with reference to the accompanying drawings in which—

Figure 1 shows a diagrammatic lay-out of the invention,

Figure 2 shows the scraping apparatus in elevation,

Figure 3 shows a section of the scraping apparatus, and

Figure 4 shows a part sectional elevation of the scraping apparatus.

Referring to the drawings and in particular Figure 1, the scraping apparatus is indicated generally by the reference numeral 1 and is positioned in the neighbourhood of a roller 2 supporting a conveyor belt 3 so that the conveyor belt 3 tends to be compressed between the roller 2 and the scraper strip designated at 4, the normal discharge point from the conveyor is in the neighbourhood of the area marked 5.

The scraper strip 4 is maintained in contact with the conveyor belt 3 by means of apparatus, hereinafter to be described, and actuated through a pulley 6, cable 7 and weight 8.

Referring now to Figures 2, 3 and 4, the scraping apparatus will be described in greater detail.

The scraper 4 is wound about a roller 9 carried on a shaft 10 which shaft is mounted in any convenient manner in a housing 11.

The strip 4 is held in position on the roller by means of a connecting element 12 which is secured at one end 13a to the roller 9, and as shown in the drawings, is carried round the outer edge of the scraper strip 4, and the other end is secured to a shaft 13 also mounted in the housing 11 and spaced from the roller 9.

The roller 9, scraper strip 4, connecting elements 12 and shaft 13 are all conveniently supported within the liquid-tight casing 11, one side 14 of which is constructed to form a chute down which the material removed from the conveyor belt by the scraper 4 is directed. The sides and ends of the housing 11 are connected to the chute plate 14 by means of nuts and bolts as shown, and each joint is provided with a rubber sealing strip 15 whereby the housing is made liquid-tight.

Arranged at the upper end of the housing is an aperture through which the operative end of the scraper strip 4 projects into contact with the conveyor belt 3. In order to make the junction of the edges of the aperture and the scraper strip water-tight, one side of the strip slides against a soft brass slide bar 16 and is held thereagainst by means of a non-corrosive spring sealing strip 17 secured to the chute 14. Thus it will be seen that the scraper strip may be passed through the aperture at the same time a liquid-tight seal is provided between the housing and the scraper strip. This liquid tight seal is advantageous in that it prevents corrosion and damage to the mechanism actuating the scraper strip. For example, if damp sand or acid enter the mechanism it would have an abrasive or corrosive effect, but by providing the liquid tight casing such effect would be eliminated.

The shaft 13 passes through the housing 11 and is supported on suitable supporting elements 18 and has fixed thereto a pulley 19. This pulley has secured thereto a cable 7 which has at least one turn taken round the pulley and to the end of which a weight 8 is secured. If desired, the weight 8 may be replaced by a spring or other suitable device for applying tension to the cable 7.

From the foregoing description it will be seen that owing to the weight 8 applying tension to the cable 7 the pulley 19 will tend to be rotated by the weight thereby tending to rotate the shaft 13 in the direction of the arrow shown in Figure 3. Rotation of the shaft 13 will wind the connecting element 12 therearound so that rotation of the shaft 13 will rotate the roller 9 in the direction of the arrow shown in Figure 3 and at the same time will move the scraper strip 4 upwardly in the direction of the arrow also shown in Figure 3. In this manner the scraper strip 4 will be continuously held in contact with the conveyor belt 3 thus providing automatic adjusting for taking up the wear caused by friction between the operative edge of the scraper strip and the conveyor belt.

The scraper strip will have a considerable life and need only be replaced at infrequent intervals.

The soft brass bar 16 also acts as a guide plate for the scraper strip 4.

Preferably the scraper strip is constructed from material such as a hard-wearing and abrasion-resisting rubber compound but it will be understood that any other suitable material may be used provided it is not so hard as to be harmful to the conveyor belt.

Although the invention has been described with reference to a scraper for removing material adhering to a conveyor belt it will be understood that the device may be used as a plough. In this case the scraping apparatus is arranged at a suitable angle to the direction of movement of the belt to cause the materials to be discharged sidewardly therefrom.

I claim:

1. Apparatus for use in removing material adhering to a conveyor belt including in combination a liquid-tight housing, a roller disposed within said housing, a scraper strip mounted about said roller with one end of said strip projecting through a wall of said housing, a shaft disposed within said housing and spaced from said roller, means within said housing for transmitting rotary motion from said shaft to said roller, and means urging said shaft rotatively to maintain the projecting end of the scraper strip in contact with the conveyor belt.

2. Apparatus according to claim 1, wherein the upper edge of one wall of the housing is adjacent the projecting portion of the scraper strip, said wall sloping downwardly and away from said strip to form a chute down which material removed from the conveyor by said scraper is directed.

3. Apparatus for use in removing material adhering to a conveyor belt including in combination, a flexible scraper strip extending across said belt, a roller spaced from said conveyor belt about which said strip is mounted, a shaft spaced from said roller, said scraper strip passing between said roller and shaft, a connecting element secured at one end to said roller and at the opposite end to said shaft for connecting said roller and shaft and for holding said scraper strip to said shaft, a pulley fixed to said shaft, a cable and weight connected to said pulley, said cable and weight urging said pulley rotatively to rotate the shaft thereby maintaining the scraper strip in contact with said conveyor belt.

HARRY HALL.

REFERENCES CITED

The following references are of record in the file of this patent:

UNITED STATES PATENTS

| Number | Name | Date |
|---|---|---|
| 1,875,442 | Greg | Sept. 6, 1932 |
| 2,398,821 | Davidson | Apr. 23, 1946 |

FOREIGN PATENTS

| Number | Country | Date |
|---|---|---|
| 499,041 | Great Britain | July 22, 1937 |